(12) United States Patent
Lerner et al.

(10) Patent No.: US 10,998,991 B2
(45) Date of Patent: May 4, 2021

(54) RADIO STATION LISTENING CONTOUR ESTIMATION

(71) Applicant: FORD GLOBAL TECHNOLOGIES, LLC, Dearborn, MI (US)

(72) Inventors: Jeremy Lerner, Southfield, MI (US); Taylor Hawley, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/534,124

(22) Filed: Aug. 7, 2019

(65) Prior Publication Data
US 2021/0044368 A1 Feb. 11, 2021

(51) Int. Cl.
| | |
|---|---|
| *H04H 60/29* | (2008.01) |
| *H04H 60/90* | (2008.01) |
| *H04H 60/51* | (2008.01) |
| *G01S 19/13* | (2010.01) |
| *H04L 29/08* | (2006.01) |

(52) U.S. Cl.
CPC ............ *H04H 60/29* (2013.01); *H04H 60/51* (2013.01); *H04H 60/90* (2013.01); *G01S 19/13* (2013.01); *H04H 2201/13* (2013.01); *H04L 67/18* (2013.01)

(58) Field of Classification Search
CPC .... H04H 2201/13; H04H 60/31; H04H 60/47; H04H 60/65; H04H 60/66; H04H 60/73; H04H 60/90; H04H 20/71; H04H 60/46; H04H 60/29; H04H 60/51; G01S 19/13; H04L 67/18
USPC .......................................................... 455/3
See application file for complete search history.

(56) References Cited

U.S. PATENT DOCUMENTS

| | | | |
|---|---|---|---|
| 7,996,018 B1 * | 8/2011 | Fan ...................... | H04B 1/3805 455/456.3 |
| 9,648,482 B2 | 5/2017 | Cooper | |
| 2003/0040272 A1 | 2/2003 | Lelievre et al. | |

OTHER PUBLICATIONS 54 dBu Service Contour for WDET-FM, 101.9 MHz, Detroit, Michigan. Retrieved from https://www.fcc.gov/media/radio/map-display#appid=270360&call=WDET-FM&freq=101.9&contour=54&city=DETROIT&state=MI&fileno=BLED-19980624KB&.map on Feb. 26, 2019.

* cited by examiner

*Primary Examiner* — Shaima Q Aminzay
(74) *Attorney, Agent, or Firm* — Michael J. Spenner; Brooks Kushman P.C.

(57) ABSTRACT

A method includes identifying, from radial contours indicating listening areas for respective radio stations, each radial contour specifying a geographic location of a respective radio station and a plurality of segments surrounding the radio station, each segment defining a radius outward from the geographic location defining a boundary of the listening area for the corresponding segment, a segment of a radial contour of a radio station currently tuned to by a radio receiver for a listener location; responsive to the listener location exceeding the radial extent from the radio station for the segment, identifying an alternate radio station available for the listener location; identifying, from the radial contours and the listener location, a segment of a radial contour of the alternate radio station; and responsive to the listener location being within a radial extent from the alternate radio station for the segment, transitioning to the alternate radio station.

20 Claims, 4 Drawing Sheets

RADIO STATION LISTENING CONTOUR ESTIMATION

TECHNICAL FIELD

Aspects of the disclosure generally relate to estimation of radio station listening contours, as well as to the use of radio station contours to aid in radio station prediction.

BACKGROUND

Radio station listening contours are coverage patterns that indicate the area surrounding a radio station within which the radio station may be receivable. In an example, a coverage pattern for a frequency modulated (FM) radio station may be calculated from the antenna height and effective transmission power of the station. In another example, a coverage pattern for an amplitude modulated (AM) radio station may be based on the transmitter power of the station, the field strength pattern of the station, the frequency of the station, and the ground conductivity of the local area. For instance, AM radio signals may travel farther over water than over land.

SUMMARY

In one or more illustrative examples, a system includes a memory configured to store radial contours, each radial contour indicating a listening area for a respective radio station, the listening area being defined by a geographic location of the respective radio station and a plurality of segments surrounding the radio station, each segment being specified as a radius outward from the geographic location of the radio station to a respective boundary of the listening area for an arc of angles relative to a reference angle. The system further includes a processor programmed to receive a listener location, identify, for a radio station currently tuned to by a radio receiver, a segment, of a radial contour of the radio station, corresponding to the listener location, responsive to a distance between the listener location and the radio station exceeding the radius from the radio station for the segment, identify an alternate radio station, identify, from the radial contours and the listener location, a segment of a radial contour of the alternate radio station, and responsive to the listener location being within a radius from the alternate radio station for the segment, transition to the alternate radio station.

In one or more illustrative examples, a method includes identifying, from radial contours indicating listening areas for respective radio stations, each radial contour specifying a geographic location of a respective radio station and a plurality of segments surrounding the radio station, each segment defining a radial extent outward from the geographic location defining a boundary of the listening area for the corresponding segment, a segment of a radio contour of a radio station currently tuned to by a radio receiver for a listener location; responsive to the listener location exceeding the radial extent from the radio station for the segment, identifying an alternate radio station available for the listener location; identifying, from the radial contours and the listener location, a segment of a radio contour of the alternate radio station; and responsive to the listener location being within a radial extent from the alternate radio station for the segment, transitioning to the alternate radio station.

In one or more illustrative examples, a system includes a memory configured to store radial contours, each radial contour indicating a listening area for a respective radio station, the listening area being specified by the radial contour as a geographic location of the respective radio station and a plurality of segments surrounding the radio station, each segment defined as a radial extent outward from the geographic location defining a boundary of the listening area for a corresponding segment of radial area surrounding the radio station, each of the segments specifying a range of angles included within the segment; a global navigation satellite system (GNSS) controller; and a processor programmed to receive a listener location from the GNSS controller, send, to a cloud server, a request for updated radial contours, the request including the listener location, receive, from the cloud server responsive to the request, updated radial contours corresponding to the listener location, store the radial contours, as received, to the memory, identify a location of a radio station currently being tuned to by a radio receiver by accessing a corresponding one of the radial contours identified according to station identification of the radio station currently being tuned to, identify, from the corresponding one of the radial contours and the listener location, an angle of the listener location from the radio station location, and a segment of the corresponding one of the radial contours from the angle, responsive to the listener location exceeding the radial extent from the radio station for the segment, identify an alternate radio station available for the listener location in the same genre as the radio station currently being tuned to, identify, from the radial contours and the listener location, a segment of a radio contour of the alternate radio station, and responsive to the listener location being within a radial distance from the alternate radio station for the segment, transition to the alternate radio station.

DETAILED DESCRIPTION

Figure 1:
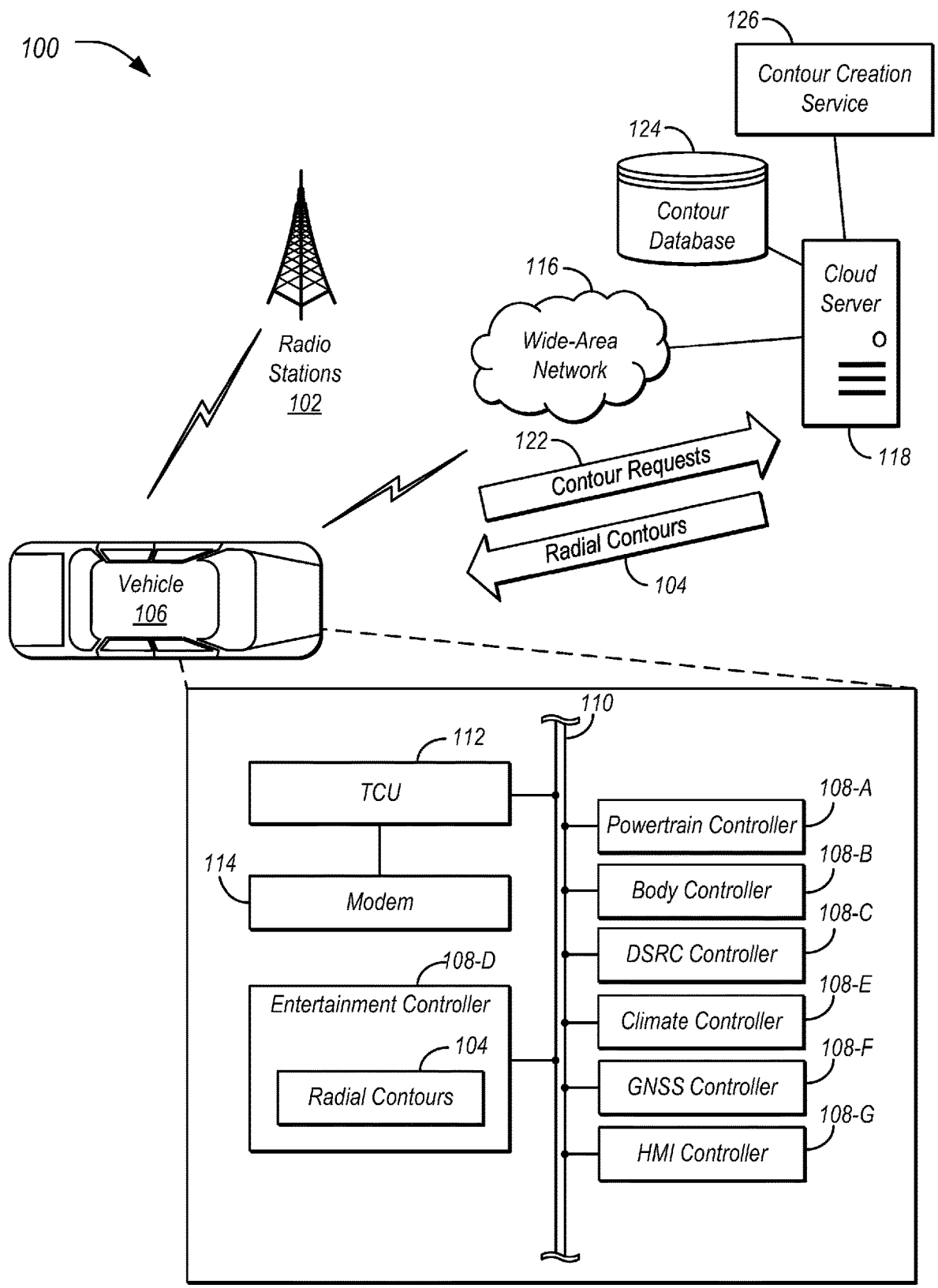
FIG. 1 illustrates an example system for the creation of radio station radial contours, as well as the use of the radial contours to aid in radio station prediction.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Radio station listening contours may be provided (by entities such as the Federal Communications Commission (FCC)) as a set of 360 geospatial coordinates (e.g., a set of 360 GPS latitude and longitudes) defining a boundary contour for a listening area of the radio station. However, it may be cumbersome and computationally expensive to determine whether a current location of a listener (such as a vehicle occupant) is or is not within the service contour. Moreover, storing the entire service contour for every radio station may require a great deal of storage.

To create a simple and scalable database of radio station contours, each individual contour can be best represented by a radius from a location of the radio station tower. Within the radius, the distance of the listener to the radio station may simply be compared to the radius. If it is shorter, the vehicle is deemed to be within the service contour. If it is longer, the vehicle is deemed to be outside of the service contour.

A database may be created that contains radial contours that indicate listening area radiuses for each radio station. The radius for each of the stations may be created using the distance of each contour point of a radio station to the radio station transmitter. For a single radio station, the radial contour can be conservatively estimated by a circle, where the radius is equal to the distance from the nearest contour point of the service contour to the tower. That is, the distance from the contour point that has the smallest distance to the transmitter itself can be assumed to be the radius. This way, when a listener is inside the radius, it may be deemed that the listener is able to receive signals from the radio station. Toward the edges of the true contour, the signal is likely to be weak, so slightly shrinking the contour may be helpful for reducing data computation costs and may also be helpful for removing areas from the contour where the vehicle is likely to receive a signal with some static. Accordingly, if a radio station service contour for a station is converted into a single radius from the radio transmitter, computational cost and storage requirements may be reduced. In a less compressed but more accurate methodology, the listening contour may be reduced into a plurality of sectors of a circle (e.g., four sectors, eight sectors, sixteen sectors, etc.), where each sector has a unique radius.

Additionally, the database may be maintained on a vehicle for use in providing radio station recommendations to a vehicle occupant based on location. The vehicle can store a small file of the radio station contours of all radio stations within a predefined proximity to the vehicle's current location or to the vehicle's most frequented locations. This file may be updated to the vehicle using over-the-air updating techniques. Then, it can be determined quickly and efficiently when a vehicle drives out of one radio station listening area. Responsive to this occurrence, a new station that the vehicle is within the listening area of, which can also be determined quickly and efficiently, may be recommended that fits a profile of preferred radio stations of the driver.

FIG. 1 illustrates an example system 100 for the creation of radio station 102 radial contours 104, as well as the use of the radial contours 104 to aid in radio station prediction. As illustrated, radio stations 102 broadcast media content using radio waves. A vehicle 106 includes a plurality of vehicle electronic control units (ECUs) or controllers 108 in communication over one or more vehicle buses 110. An entertainment controller 108-D of the vehicle 106 may be used to listen to the radio stations 102. The entertainment controller 108-D may also maintain radial contours 104 that indicate the listening areas for the radio stations 102. The vehicle 106 may also include a telematics control unit (TCU) 112 that utilizes a modem 114 to send contour requests 122 for radial contours 104 to a cloud server 118 and to receive the radial contours 104 retrieved by the cloud server 118 from a contour database 124.

The radio stations 102 may include one or more sources of media content. In many examples, the radio stations 102 transmit the media content via broadcast over radio waves. Radio signals may be in various formats, such as amplitude modulated (AM), frequency modulated (FM), analog, or digital. The radio stations 102 may also broadcast or otherwise be linked to genre classifications indicative of the types of media content broadcast by the radio stations 102. For instance, radio data system (RDS) is a communications protocol standard for embedding small amounts of digital information in conventional FM radio broadcasts, and standardizes several types of information transmitted, including time, station identification, and program information.

The vehicle 106 may include various types of automobile, crossover utility vehicle (CUV), sport utility vehicle (SUV), truck, recreational vehicle (RV), boat, plane or other mobile machine for transporting people or goods. In many cases, the vehicle 106 may be powered by an internal combustion engine. As another possibility, the vehicle 106 may be a battery-electric vehicle (BEV) powered by one or more electric motors, a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 106 may vary, the capabilities of the vehicle 106 may correspondingly vary. As some other possibilities, vehicles 106 may have different capabilities with respect to passenger capacity, towing ability and capacity, and storage volume. For title, inventory, and other purposes, vehicles 106 may be associated with unique identifiers, such as VINs.

The vehicle 106 may include a plurality of controllers 108 configured to perform and manage various vehicle 106 functions under the power of the vehicle battery and/or drivetrain. As depicted, the example vehicle controllers 108 are represented as discrete controllers 108-A through 108-G. However, the vehicle controllers 108 may share physical hardware, firmware, and/or software, such that the functionality of multiple controllers 108 may be integrated into a single controller 108, and that the functionality of various such controllers 108 may be distributed across a plurality of controllers 108.

As some non-limiting vehicle controller 108 examples: a powertrain controller 108-A may be configured to provide control of engine operating components (e.g., idle control components, fuel delivery components, emissions control components, etc.) and for monitoring status of such engine operating components (e.g., status of engine codes); a body controller 108-B may be configured to manage various power control functions such as exterior lighting, interior lighting, keyless entry, remote start, and point of access status verification (e.g., closure status of the hood, doors and/or trunk of the vehicle 106); a DSRC transceiver controller 108-C may be configured to communicate with key fobs, mobile devices, or other local vehicle 106 devices; an entertainment controller 108-D may be configured to support voice command and BLUETOOTH interfaces with the driver and driver carry-on devices as well as to play content from radio stations 102 or other sources of media content; a climate control management controller 108-E may be configured to provide control of heating and cooling system components (e.g., compressor clutch, blower fan, temperature sensors, etc.); a global navigation satellite system (GNSS) controller 108-F may be configured to provide vehicle location information; and a human-machine interface (HMI) controller 108-G may be configured to receive user input via various buttons or other controls, as well as provide vehicle status information to a driver, such as fuel level information, engine operating temperature information, and current location of the vehicle 106.

The vehicle bus 110 may include various methods of communication available between the vehicle controllers 108, as well as between the TCU 112 and the vehicle controllers 108. As some non-limiting examples, the vehicle bus 110 may include one or more of a vehicle controller area network (CAN), an Ethernet network, or a media-oriented system transfer (MOST) network. Further aspects of the layout and number of vehicle buses 110 are discussed in further detail below.

The TCU 112 may include network hardware configured to facilitate communication between the vehicle controllers 108 and with other devices of the system 100. For example, the TCU 112 may include or otherwise access a cellular modem 114 configured to facilitate communication with a wide-area network 116. The wide-area network 116 may include one or more interconnected communication networks such as the Internet, a cable television distribution network, a satellite link network, a local area network, and a telephone network, as some non-limiting examples. As another example, the TCU 112 may utilize one or more of BLUETOOTH, Wi-Fi, or wired USB network connectivity to facilitate communication with the wide-area network 116 via the user's mobile device.

The TCU 112 and the controllers 108 may each include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The cloud server 118 may include various types of computing apparatus, such as a computer workstation, a server, a desktop computer, a virtual server instance executed by a mainframe server, or some other computing system and/or device. Similar to the TCU 112, the cloud server 118 generally includes a memory on which computer-executable instructions may be maintained, where the instructions may be executable by one or more processors (not shown for clarity). Such instructions and other data may be stored using a variety of computer-readable media. In a non-limiting example, the cloud server 118 may be configured to maintain the contour database 124, which includes a plurality of radial contours 104 indexed according to physical location, station identifier, genre, and/or other criteria.

Each radial contour 104 may indicate a geographic location of one of the radio stations 102, as well as one or more radial distances from the geographic location that indicate listening area radiuses for the radio station 102. This is opposed to radio station contours that are provided as a set of geospatial coordinates of the extent of a reach of the radio station 102.

A contour creation service 126 may be an example of a software application installed to a memory (not shown) of the cloud server 118. When executed by one or more processors (not shown) of the cloud server 118, the contour creation service 126 may be programmed to cause the cloud server 118 to convert a representation of a listening area of a radio station 102 from a set of geospatial coordinates into a representation having a center point and one or more radial distances. Determination of the center point and radial distances may be accomplished in various ways.

In one example, the contour creation service 126 may determine the center point to be the geographic center of the set of geospatial coordinates. In another example, the contour creation service 126 may determine the center as a provided geographic location of the radio station 102. With respect to the radial distances, in one example the contour creation service 126 may determine the radial distance as being the distance from the set of coordinates that has the smallest distance to the radio station 102. In another example, the contour creation service 126 may determine the radial distance as being the average distance of the coordinates in the set of coordinates to the center point. In some examples, as the signal from the radio station 102 is likely to be weak near the boundary of the listening area, the radius may be shrunk below the absolute maximum range (e.g., by a predefined percentage of distance such as 2%, 5%, or 10%, or by a predefined distance, such as one mile, two miles, five miles, etc.).

Figure 2:
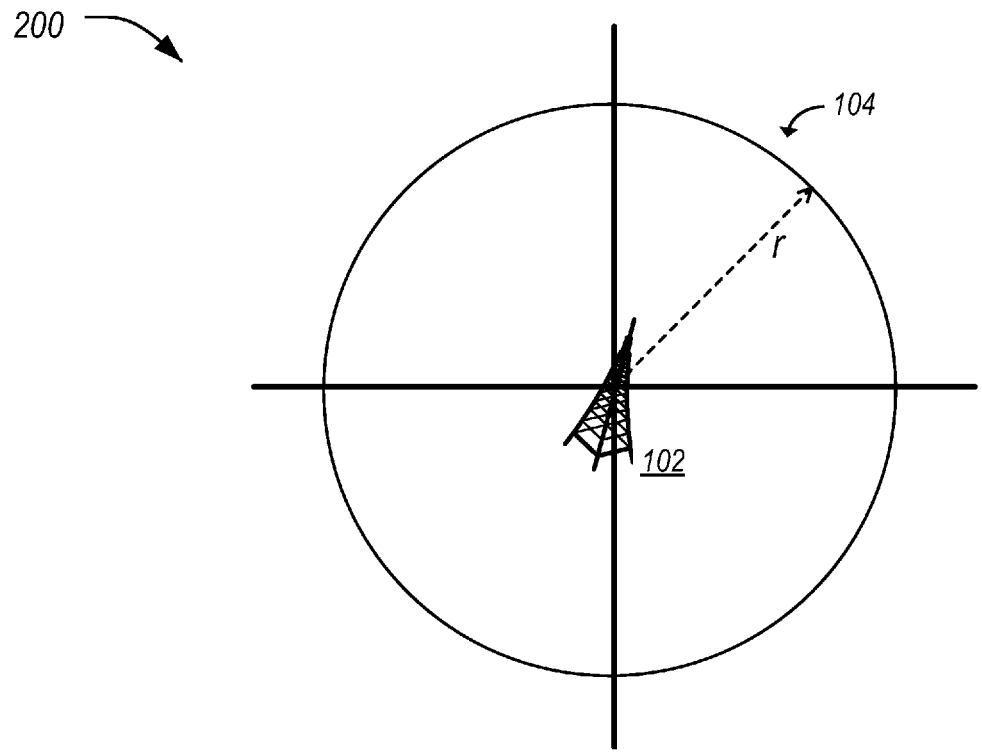
FIG. 2 illustrates an example of a radial contour having a single radius.

FIG. 2 illustrates an example 200 of a radial contour 104 having a single radius. As shown, the radio station 102 is at the center of the radial contour 104. Additionally, a radius r is indicated as being the distance from the center point to the boundary of the listening area for the radio station 102. If a listener is within the radius r to the radio station 102, the listener is deemed to be within the listening area of the radio station 102. If not, then the listener is deemed to be outside of the listening area. Notably, this computation may be performed more simply than a comparison of a listener location to a set of geographic coordinates defining a closed boundary, to determine whether the current location is enclosed in the set of geographic coordinates.

Figure 3:
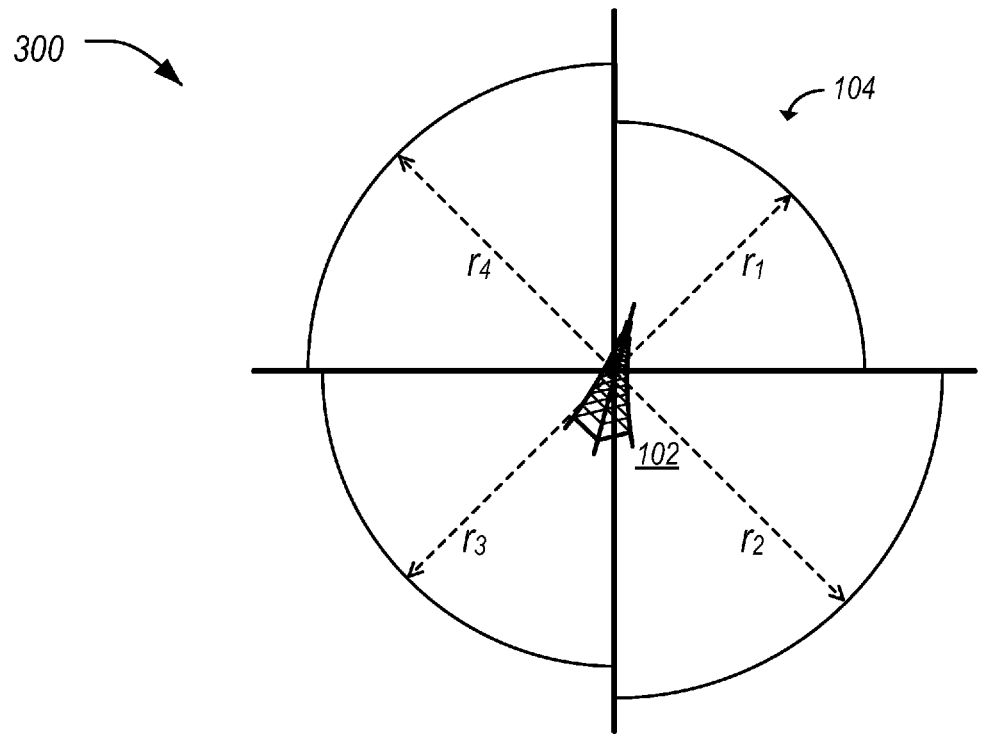
FIG. 3 illustrates an example of a radial contour having a plurality of segments each with a unique radius.

FIG. 3 illustrates an example 300 of a radial contour 104 having a plurality of segments each with a unique radius. In this less compressed but more accurate methodology, the radial contour may be reduced into a plurality of sectors of a circle (e.g., four sectors, eight sectors, sixteen sectors, etc.), where each sector has a unique radius. In an example with four sectors, the minimum radius for every 90 degrees of the radial contour could be found, so if the listener is northeast of the tower the listening radius is approximately $r_1$ meters, if the listener is southeast of the tower the radius is $r_2$, southwest the radius is $r_3$, and northwest the radius is $r_4$. Each segment may, in an example, specify a range of angles from the center point that are included within the segment. Similar to as done for the case of the single radius, the radiuses $r_1$, $r_2$, $r_3$, and $r_4$ may be found by the aforementioned approaches, such as by finding a minimum distance from the service contour within that sector of the circle to the radio station 102. The vehicle 106 or other listener may then determine which sector it is in relative to the radio station 102 (e.g., is it northeast, southwest, etc. of the radio station 102) and use the appropriate radius to determine the listening area for the sector. This can be particularly useful for mountainous regions where radio broadcasting signals are typically not a consistent radius from the radio station 102 in all directions.

Figure 4:
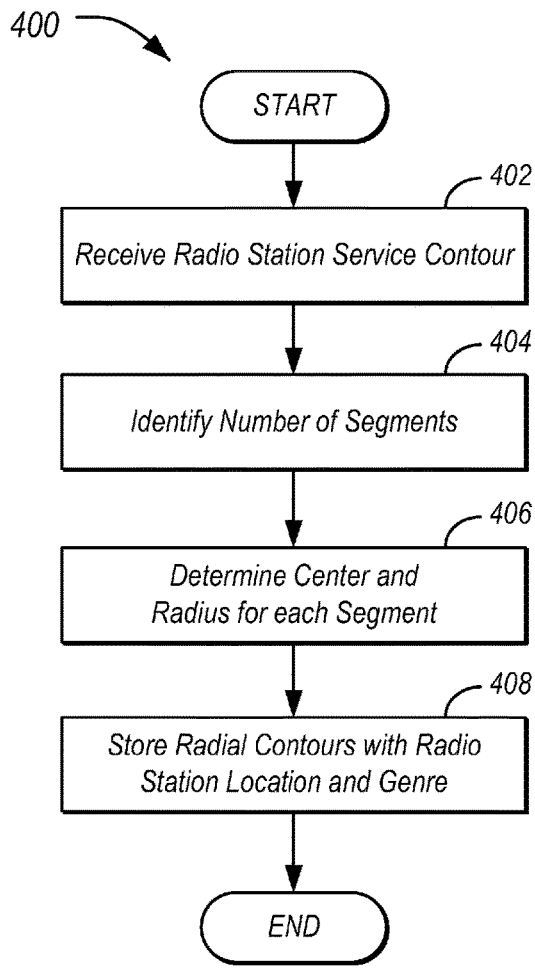
FIG. 4 illustrates an example process for the creation of radial contours.

FIG. 4 illustrates an example process 400 for the creation of radial contours 104. In an example, the process 400 may be performed by the contour creation service 126 of the cloud server 118 in the context of the system 100. While described as being performed by the contour creation service 126 of the cloud server 118, it should be noted that in other examples the operations of the contour creation service 126 may be performed on-vehicle.

At operation 402, the contour creation service 126 receives radio station service contours. In an example, the contour creation service 126 may receive new or updated radio station service contours from a source such as the FCC, periodically, or upon request. In another example, the contour creation service 126 may receive new or updated radio station service contours from the radio stations 102 themselves. In yet another example, the contour creation service 126 may receive new or updated radio station service contours from crowd-sourced signal strength information provided by listeners.

At 404, the contour creation service 126 identifies a number of segments to use to generate the radial contours 104. In an example, the number of segments may be predefined for all radial contours 104, e.g., as one segment, four segments, or eight segments as some possibilities. In another example, the number of segments may vary between radial contours 104 according to variation in the radio station service contour data. For instance, if the radio station service contour data indicates a relatively round listening area, then fewer segments may be required, while if the radio station service contour data indicates a more varied service area, then a greater number of segments may be used. As yet another possibility, the number of segments may vary based on the type of radio station. For instance, a frequency modulated (FM) radio station may be defined by radial contours as including a first predefined number of segments, and a listening area for an amplitude modulated (AM) radio station may be defined by radial contours including a second predefined number of segments.

The contour creation service 126 determines a center for each radial contour 104 as well as a radius for each of the segments of the radial contour 104 at 406. In an example, the contour creation service 126 may use one or more of the techniques discussed in detail above with respect to FIGS. 1-3. At 408, the contour creation service 126 stores the radial contours 104 in the contour database 124. In an example, the contour creation service 126 stores the radial contours 104 indexed according to physical location, station identifier, genre, and/or other criteria. After operation 408, the process 400 ends.

Referring back to FIG. 1, as mentioned above the entertainment controller 108-D may maintain radial contours 104 that indicate the listening areas for the radio stations 102. To maintain up-to-date radial contour 104 information, the entertainment controller 108-D may retrieve a current location of the vehicle 106 from the GNSS controller 108-F and may direct the TCU 112 to send that location in a contour request 122 to the cloud server 118. Responsive to receipt of the contour request 122, the cloud server 118 may access the contour database 124 to retrieve updated radial contours 104 for radio stations 102 within a predefined proximity to the current location (e.g., fifty miles, one hundred miles, etc.). The cloud server 118 may return these radial contours 104 to the entertainment controller 108-D. Using the up-to-date radial contours 104, the vehicle 106 may use the current location of the vehicle 106 to identify whether the vehicle 106 is located within the radial contour 104 of the radio station currently tuned to by the entertainment controller 108-D. If not, a different radio station 102 may be selected.

Figure 5:
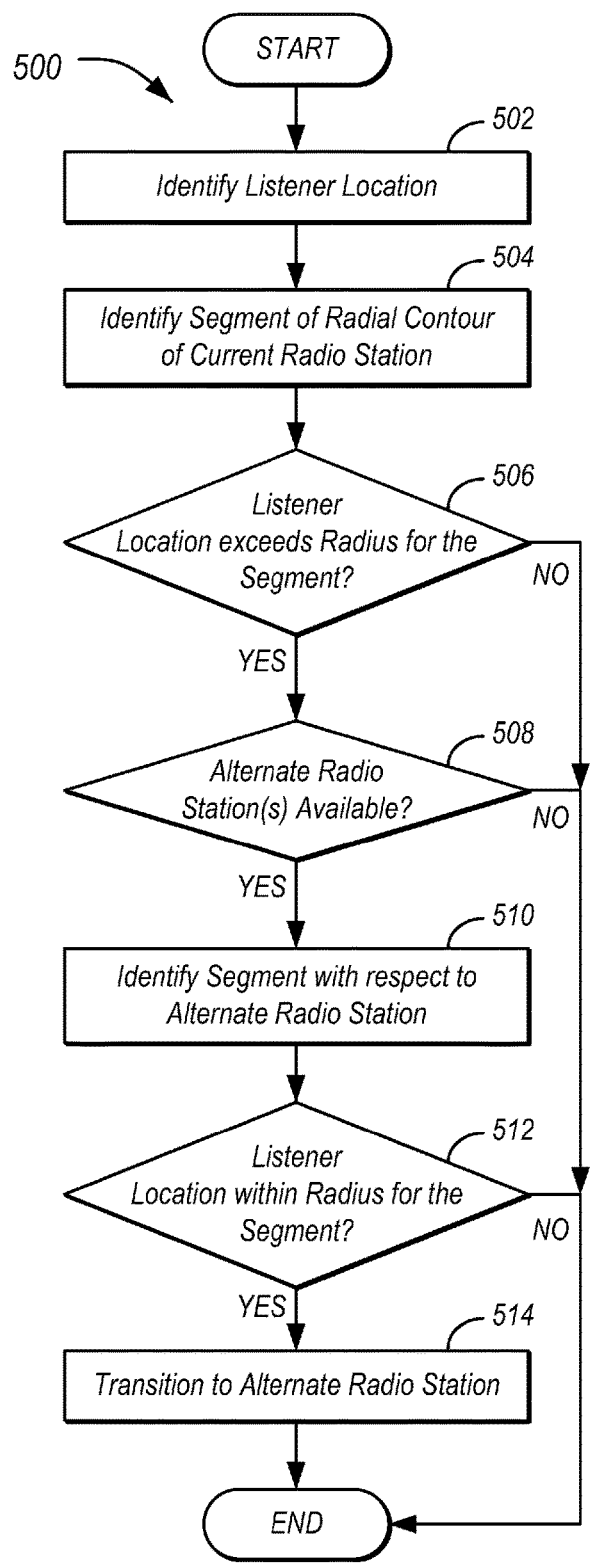
FIG. 5 illustrates an example process for the transitioning from one radio station to another radio station utilizing the radial contours.

FIG. 5 illustrates an example process 500 for the transitioning from one radio station 102 to another radio station 102 utilizing the radial contours 104. In an example, the process 500 may be performed by the entertainment controller 108-D of the vehicle 106 in the context of the system 100.

The vehicle 106 identifies a listener location at 502. In an example, the vehicle 106 may utilize the GNSS controller 108-F to poll a geographic location of the vehicle 106 (e.g., periodically). At 504, the vehicle 106 identifies a segment of a radial contour 104 corresponding to the current radio station 102. In an example, the vehicle 106 identifies, based on the center location of the radial contour 104, the vehicle 106 location relative to the center location of the current radio station 102. A vector from the center location to the vehicle 106 location may give an angle, which may then be used to identify the segment. The angles may be relative to a reference angle. In one non-limiting example, the angle of the vehicle and the angles of the segments may be identified relative to magnetic North. In another example, the angle may be relative to another fixed object, such as a beacon transceiver or landmark.

At 506, the vehicle 106 determines whether the listener location exceeds the radius for the segment. In an example, the vehicle 106 utilizes the specific radius corresponding to the identified segment to determine whether the vehicle 106 is or is not inside the radius for the identified segment. If the listener location is within the radius, no change in radio station 102 is indicated and the process 500 ends. If the listener location exceeds the radius, control passes to operation 508.

At operation 508, the vehicle 106 determines whether other radio stations 102 are available. In an example, the vehicle 106 may attempt to identify an alternate radio station 102 in the same genre as the current radio station 102. In another example, for instance when no stations of the same genre are available or nearby, the vehicle 106 may attempt to identify an alternate radio station 102 regardless of genre, or in another genre that the listener has a history of listening to. If one or more alternate radio stations 102 are available, control passes to operation 510. Otherwise there is no better alternative radio station 102 and the process 500 ends.

At 510, the vehicle 106 identifies a segment of a radial contour 104 corresponding to the alternate radio station 102. In an example, the vehicle 106 identifies, based on the center location of the radial contour 104, the vehicle 106 location relative to the center location of the alternate radio station 102. A vector from the center location to the vehicle 106 location may give an angle, which may then be used to identify the segment. The angles may be relative to a reference angle, such as North or South or another arbitrary choice that is verifiable.

At operation 512, the vehicle 106 determines whether the listener location is within the radius for the segment of the radial contour 104 of the alternate radio station 102. If so, control passes to operation 514 to transition to the alternate radio station 102. For instance, the entertainment controller 108-D may prompt the user to tune from the current radio station 102 to the alternate radio station 102, or may automatically tune from the current radio station 102 to the alternate radio station 102. After operation 512, the process 500 ends.

Thus, by using the radial contours 104, the system 100 quickly and efficiently determines when a vehicle 106 drives out of one radio station 102 listening area. Responsive to this occurrence, a new radio station 102 that the vehicle 106 is within the listening area of, which can also be determined quickly and efficiently, may be recommended that fits a profile of preferred radio stations of the driver.

Variations on the described systems and methods are possible. In one example, there may exist a contour sampling point with a higher signal strength yet that is further away from a radio station 102. Additionally, due to ground conductivity influences, there may exist multiple radii with separate signal strengths that coincide. For instance, a valley might create multiple arcs for the same radial direction (one closer to the radio station 102 and one further away), where the region between the arcs defines a dead signal region. Moreover, a third arc beyond the first two arcs may define the final boundary of the radio station 102 area. In such a situation, the user location may be compared to the multiple arcs, to see if the user is within the listening range, but not within the arcs defining the valley.

Figure 6:
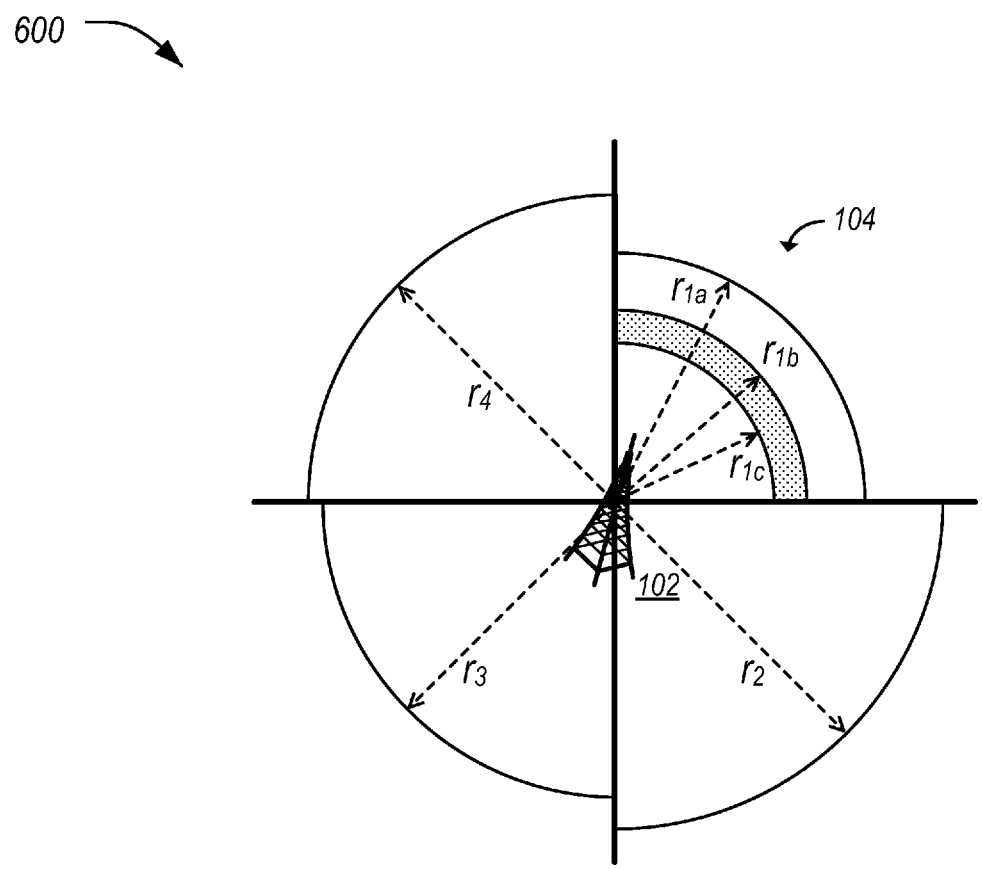
FIG. 6 illustrates an example of a radial contour having multiple arcs for a set of radii.

FIG. 6 illustrates an example 600 of a radial contour 104 having multiple arcs for a set of radii. In this example, as compared to the example 300, if the listener is northeast of the tower the listening radius is approximately $r_{1a}$ meters, but if the listener is between $r_{1b}$ and $r_{1c}$ then the tower is unreachable by the listener. The vehicle 106 or other listener may then determine which sector it is in relative to the radio station 102 (e.g., is it northeast, southwest, etc. of the radio station 102) and use the multiple radiuses to determine the listening area for the sector. This can be particularly useful for regions where radio broadcasting signals have dead spots. It should be noted that while the exclude region in the illustrated example of $r_{1b}$ and $r_{1c}$ falls within a single outer listening radius $r_{1a}$, in other examples, the exclude region may extend across multiple outer listening radii.

The contour creation service 126 may receive crowd-sourced signal strength information provided by listeners and may use that information to identify regions in which a radio station 102 may be unavailable. For instance, the listeners may log locations within the overall radial contour 104 where the listener should be able to receive signal from the radio station 102 but is unable to. This information may be used by the contour creation service 126 to create a bounded area surrounding a collection of points at which the radio station 102 was unavailable.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
  a memory configured to store radial contours, each radial contour indicating a listening area for a respective radio station, the listening area being defined by a geographic location of the respective radio station and a plurality of segments surrounding the radio station, each segment being specified as a radius outward from the geographic location of the radio station to a respective boundary of the listening area for an arc of angles relative to a reference angle; and
  a processor programmed to
    receive a listener location,
    identify, for a radio station currently tuned to by a radio receiver, a segment, of a radial contour of the radio station, corresponding to the listener location, responsive to a distance between the listener location and the radio station exceeding the radius from the radio station for the segment, identify an alternate radio station, identify, from the radial contours and the listener location, a segment of a radial contour of the alternate radio station, and responsive to the listener location being within a radius from the alternate radio station for the segment, transition to the alternate radio station.

2. The system of claim 1, further comprising a global navigation satellite system (GNSS) controller, wherein the processor is further programmed to poll the listener location from the GNSS controller.

3. The system of claim 1, wherein the processor is further programmed to:

identify, based on a geographic location of the radio station, an angle offset from the reference angle of the listener location relative to the geographic location of the radio station, and identify the segment according to the angle.

4. The system of claim 1, wherein the plurality of segments consists of four segments, a first segment including locations from due north to due east of the radio station, a second segment including locations from due east to due south of the radio station, a third segment including locations from due south to due west of the radio station, and fourth segment including locations from due west to due north of the radio station.

5. The system of claim 1, wherein each of the segments specifies a range of angles relative to the reference angle that are included within the segment.

6. The system of claim 1, wherein a listening area for a frequency modulated (FM) radio station is defined by the radial contours as including a first predefined number of segments, and a listening area for an amplitude modulated (AM) radio station is defined by the radial contours as including a second predefined number of segments.

7. The system of claim 1, further comprising a modem, wherein the processor is further programmed to:

send, to a cloud server, a request for updated radial contours, the request including the listener location, receive, from the cloud server responsive to the request, the updated radial contours corresponding to the listener location, and store the radial contours, as received, to the memory.

8. A method comprising:

maintaining radial contours indicating listening areas for respective radio stations, each radial contour defining a geographic location of the respective radio station and a plurality of arc segments surrounding the radio station, each segment being defined as a radius outward from the geographic location of the radio station to a respective boundary of the listening area;

identifying, for a radio station currently tuned to by a radio receiver, a segment of one of the radial contours corresponding to the listener location;

responsive to the listener location exceeding the boundary from the radio station defined by the radius of the segment, identifying an alternate radio station available for the listener location;

identifying, from the radial contours and the listener location, a segment of a radial contour of the alternate radio station; and responsive to a distance between the listener location and the alternate radio station being within a radius from the alternate radio station for the segment, transitioning to the alternate radio station.

9. The method of claim 8, further comprising:

receiving a radio station service contour defining a listening area for a radio station, the radio station service contour including a set of geospatial coordinates defining a boundary contour for the listening area;

determining a center location of the listening area from the set of geospatial coordinates;

determining radii of a plurality of segments surrounding the center location, each segment defining a radius outward from the center location defining a boundary of the listening area for a set of angles relative to a reference angle; and storing the center location and radii in a memory as one of the radial contours.

10. The method of claim 9, further comprising determining the center location as being a geographic center of the set of geospatial coordinates.

11. The method of claim 9, further comprising determining the center location as being provided as a location of the radio station.

12. The method of claim 9, further comprising determining the radius of one of the plurality of segments as a distance to the center location from a point in the set of geospatial coordinates within the segment that is closest to the center location.

13. The method of claim 9, further comprising determining the radius of one of the plurality of segments as an average distance to the center location from each point in the set of geospatial coordinates within the segment to the center location.

14. The method of claim 8, further comprising:

identifying, based on a geographic location of the radio station, an angle of the listener location relative to the geographic location of the radio station and a reference angle, and identifying the segment according to the angle.

15. The method of claim 8, further comprising:

sending, to a cloud server, a request for updated radial contours, the request including the listener location, receiving, from the cloud server responsive to the request, the radial contours corresponding to the listener location, and storing the radial contours, as received, to a memory maintaining the radial contours indicating the listening areas for the respective radio stations.

16. A system comprising:

a memory configured to store radial contours, each radial contour indicating a listening area for a respective radio station, the listening area being defined by a geographic location of the respective radio station and a plurality of arc segments surrounding the radio station, each segment being defined as a radius outward from the geographic location of the radio station to a respective boundary of the listening area, each of the segments specifying a range of angles relative to a reference angle that are included within the segment;

a global navigation satellite system (GNSS) controller; and a processor programmed to receive a listener location from the GNSS controller, send, to a cloud server, a request for updated radial contours, the request including the listener location, receive, from the cloud server responsive to the request, updated radial contours corresponding to the listener location, store the radial contours, as received, to the memory, identify a location of a radio station currently being tuned to by a radio receiver by accessing a corresponding one of the radial contours identified according to station identification of the radio station currently being tuned to, identify, from the corresponding one of the radial contours and the listener location, an angle of the listener location from the radio station location relative to the reference angle, and a segment of the corresponding one of the radial contours from the angle, responsive to the listener location exceeding the radius from the radio station for the segment, identify an alternate radio station in the same genre as the radio station currently being tuned to, identify, from the radial contours and the listener location, a segment of a radio contour of the alternate radio station, and responsive to the listener location being within a radial distance from the alternate radio station for the segment, transition to the alternate radio station.

17. The system of claim 16, further comprising the cloud server, wherein the cloud server is programmed to:

receive a radio station service contour defining a listening area for a radio station, the radio station service contour including a set of geospatial coordinates defining a boundary contour for the listening area;

determine a center location of the listening area from the set of geospatial coordinates;

determine radii of a plurality of segments surrounding the center location, each segment defining a radius outward from the center location defining a boundary of the listening area for the corresponding segment; and store the center location and radii in a memory as one of the radial contours.

18. The system of claim 17, wherein the cloud server is further programmed to determine the center location as being a geographic center of the set of geospatial coordinates.

19. The system of claim 17, wherein the cloud server is further programmed to one or more of:

determine the radius of one of the plurality of segments as a distance to the center location from a point in the set of geospatial coordinates within the segment that is closest to the center location; or determine the radius of one of the plurality of segments as an average distance to the center location from each point in the set of geospatial coordinates within the segment to the center location.

20. The system of claim 17, wherein the radial contours include a plurality of radiuses outward from the center location for the angle of the listener location, the plurality of radiuses including an outer boundary of the listening area for the corresponding segment, a first boundary of a dead zone within the outer boundary of the listening area, and a second boundary of the dead zone within the outer boundary of the listening area, and the processor is programmed to treat the radio station as unreachable when the listener location is between the second boundary and the third boundary.

* * * * *